(12) United States Patent
Levit et al.

(10) Patent No.: US 8,025,124 B2
(45) Date of Patent: Sep. 27, 2011

(54) BROADBAND PASSIVE DISTRIBUTED TUNED VIBRATION AND ACOUSTIC ABSORBER FOR MODALLY DENSE STRUCTURES

(75) Inventors: Natalia V Levit, Glen Allen, VA (US); Mark Allan Lamontia, Landenberg, PA (US); David M Mellen, Wilmington, DE (US); Joseph A King, Jr., Midlothian, VA (US); Kathleen Kondylas, Newburyport, MA (US); Christopher R Fuller, Virginia Beach, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 86 days.

(21) Appl. No.: 12/262,778

(22) Filed: Oct. 31, 2008

(65) Prior Publication Data
US 2009/0113843 A1    May 7, 2009

Related U.S. Application Data

(60) Provisional application No. 61/001,137, filed on Oct. 31, 2007.

(51) Int. Cl.
*E04B 1/82* (2006.01)
(52) U.S. Cl. ......................... 181/286; 181/284
(58) Field of Classification Search .................. 181/286, 181/284
See application file for complete search history.

(56) References Cited

U.S. PATENT DOCUMENTS

| 503,049 | A | | 8/1893 | Kennedy | |
|---|---|---|---|---|---|
| 2,541,159 | A | * | 2/1951 | Geiger | 181/208 |
| 3,081,519 | A | | 3/1963 | Blades et al. | |
| 3,227,794 | A | | 1/1966 | Anderson et al. | |
| 3,860,369 | A | | 1/1975 | Brethauer et al. | |
| 4,373,608 | A | * | 2/1983 | Holmes | 181/202 |
| 4,667,768 | A | * | 5/1987 | Wirt | 181/286 |
| 4,999,222 | A | | 3/1991 | Jones et al. | |
| 5,241,512 | A | * | 8/1993 | Argy et al. | 367/1 |
| 5,670,758 | A | * | 9/1997 | Borchers et al. | 181/286 |
| 5,824,973 | A | | 10/1998 | Haines et al. | |
| 6,290,022 | B1 | * | 9/2001 | Wolf et al. | 181/292 |
| 7,157,117 | B2 | | 1/2007 | Mikhael et al. | |
| 7,395,898 | B2 | * | 7/2008 | Yang et al. | 181/286 |
| 7,464,790 | B2 | * | 12/2008 | Kodama et al. | 181/295 |
| 2003/0062217 | A1 | | 4/2003 | Sheng et al. | |
| 2006/0065482 | A1 | | 3/2006 | Schmidft et al. | |
| 2006/0131103 | A1 | | 6/2006 | Fuller et al. | |
| 2006/0169557 | A1 | | 8/2006 | Goetchius | |

FOREIGN PATENT DOCUMENTS

GB 887535 1/1962
WO PCT/US2008/081965 10/2007

* cited by examiner

*Primary Examiner* — Forrest M Phillips

(57) ABSTRACT

A passive distributed vibration absorber that utilizes multiple discrete mass elements and a viscoelastic layer and that effectively attenuates vibration in modally dense structures excited by a broadband input noise excitation. and is tunable to multiple natural frequencies in such modally dense vibrating structures including low frequencies.

5 Claims, 9 Drawing Sheets

BROADBAND PASSIVE DISTRIBUTED TUNED VIBRATION AND ACOUSTIC ABSORBER FOR MODALLY DENSE STRUCTURES

BACKGROUND OF THE INVENTION

1. Field of the Invention

This invention is directed to material and methods for reducing vibration in structures.

2. Description of the Related Art

Resonance occurs when a frequency is introduced at which a structure naturally vibrates. When a structure is excited at one or more of its resonant frequencies (for purposes of this invention, referred to as "natural frequencies"), an amplified motion (in terms of displacement, velocity, or acceleration) response occurs. When resonant excitation occurs within the audible frequency range (20 Hz to 20,000 Hz), the result is sound that, if of sufficient amplitude, is objectionable. Objectionable vibration may occur when a structure undergoes resonant response at any frequency.

Various active and passive noise reduction control techniques are known and used to control structural vibration and accompanying sound radiation. For purposes of this invention, vibration will be considered as including sound. Active vibration control systems use sensors to measure the amplitude and phase of vibration and/or noise from a vibrating structure. The sensed vibration or noise is inverted and fed to an actuator or loudspeaker to cancel the troublesome vibration or noise. In practice this technique reduces the vibration or noise significantly but does not eliminate it altogether. Active control systems are typically effective at lower frequencies such as below 1000 Hz. In many instances active noise reduction techniques adequately reduce vibrations and noise, but at the cost of expensive and complex sensing/actuation/feedback control/connectivity systems.

In contrast to active control systems, passive vibration and noise control systems made in sheet form usually are less complex and less costly. However, passive control systems can have significant mass and are typically practical only at frequencies above 500 Hz since it is at these relatively higher frequencies that the dimensions of the passive control systems are comparable with the relatively short wavelength of the vibration of the vibrating body. Application of a passive vibration or sound control system is generally ineffective as the physical thickness is generally too large and the mass is generally too high, therefore flexibility of such systems is limited to conform to non-flat systems, such as wall cavity, spatially challenging structures, pipes.

A third alternative is a passive control system known as a tuned vibration absorber (TVA). When using a tuned vibration absorber, a spring-mass system is tuned to vibrate at a frequency of interest, e.g. the same vibration frequency of the structure undergoing troublesome vibration onto which the vibration absorber is attached or mounted. In use, at the tuning frequency of interest, the tuned vibration absorber vibrates out-of-phase with the troublesome structural vibration and applies a force opposite the motion of the structure, thus reducing the original structure's motion response.

So-called point tuned vibration absorbers are an effective method of reducing the noise or vibration of a structure. However, a point absorber only controls the vibration or noise at one frequency at one point on the structure and is thus limited in its function to control vibrations over a large area of the vibrating body.

Most real structures vibrate at many frequencies simultaneously when excited by a broad band function (noise and/or vibration). For purposes of this invention, a structure is defined as "modally dense." when the natural frequencies are closely spaced apart in the frequency domain, For example, major structural components used in buildings, such as single and double stud walls, floors, and ceilings, are modally dense vibrating structures as a result of the mass and geometry of the components, nonuniform properties of the building components, such as nonuniform density or thickness, the complicated joinery, attachment and mounting methods used in such building components and the resultant boundary conditions. Metal enclosures conventionally used for various kinds of industrial equipment, such as, for example, fans, chillers, motors, air handlers, pumps, generators, compressors, etc., are also modally dense vibrating structures.

There is a concern when applying a single degree of freedom tuned vibration absorber to modally dense structures. That is, when a single degree of freedom tuned vibration absorber tuned to a given natural frequency is applied to the structure that has excessive vibration or noise, the resonant response at the targeted natural frequency is reduced but the resonant response is increased at two new frequencies, one at a frequency lower than the targeted natural frequency (at which the absorber mass moves in phase with the structural mass) and another at a frequency higher than the targeted natural frequency (at which the absorber mass moves out-of-phase with the structural mass). That is, the targeted mode is split into two response frequencies, which in turn will be superimposed on the pre-existing structural modes, and will increase noise and/or vibration at one or both of the two response frequencies if the pre-existing response is in phase with the new modal response. In fact, the sound response (sound pressure level (SPL)) and/or the vibration response (root mean square (RMS) displacement, RMS velocity, or RMS acceleration) at the two new frequencies can be undesirably large, larger than the original frequency response at the two specific frequencies which was low before the vibration absorber was applied. Thus, in a modally dense vibrating structure having multiple closely spaced natural frequencies, the application of a single degree of freedom vibration absorber tuned to one natural frequency can result in an undesirable increase in vibration and/or acoustic radiation at adjacent natural frequencies.

In contrast to "modally dense" structures, "modally sparse" structures exhibit a frequency response function in which the majority of natural frequencies are not affected by the application of single degree of freedom vibration absorbers tuned to adjacent natural frequencies. Such structures are typically ideal or laboratory scale structures. FIGS. 1a and 1b illustrate the frequency distributions of modally sparse and modally dense structures, respectively. In the response function of FIG. 1a, the majority of resonant responses are not affected by neighboring modes. In contrast, in the response function of FIG. 1b, the majority of resonant responses overlap.

The spacing of the natural frequencies in a modally dense structure depends upon the frequency range of interest. Natural frequencies spaced about 40 Hz or less may be sufficient for a structure to be considered modally dense at lower frequencies, such as below about 500 Hz, whereas at higher frequency ranges, natural frequencies could be spaced less closely apart and still be considered modally dense.

None of the known passive vibration and acoustic absorbers adequately controls vibration and/or acoustic radiation from modally dense vibrating structures. It would be desirable to have a passive system which would reduce unwanted vibration and/or noise from a modally dense vibrating structure at multiple natural frequencies, particularly over a continuous frequency range, without introducing additional unwanted vibration and/or noise at other frequencies.

BRIEF SUMMARY OF THE INVENTION

In one embodiment the subject invention is a vibration absorber comprising a viscoelastic layer for distribution over a modally dense vibrating structure having an effective mass and that when excited by a broadband input excitation, the vibrating structure exhibits a frequency response spectrum in which a first and a second targeted natural frequency are present and a plurality of discrete mass elements in contact with said viscoelastic layer wherein a first portion of the discrete mass elements are tuned to absorb vibration at the first targeted natural frequency and a second portion of the discrete mass elements are tuned to absorb vibration at the second targeted natural frequency of the vibrating structure.

DETAILED DESCRIPTION OF THE INVENTION

The invention is directed to a vibration absorber to control vibration and/or noise or acoustic radiation from the surface of a modally dense vibrating structure, and to a structure for controlling vibration and/or noise or acoustic radiation incorporating the absorber. The absorber of the invention is effective at controlling vibration and reducing acoustic radiation from a modally dense structure at two or more natural frequencies when the structure is excited by a broadband input noise excitation without creating excessive or objectionable vibration and/or noise or sound at other frequencies. The term "broadband input excitation" refers to noise and/or vibration excitation across a frequency band rather than at a single frequency. Closely-spaced single frequencies constitute a frequency band. They excite split modes as described above. Thus, closely-spaced single frequency excitation is "broadband excitation". White noise, pink noise, random noise, and pseudo random noise, optionally combined with periodic excitations at single frequencies, are all examples of broadband input excitation. There are many practical examples of broadband input excitations at frequencies below 500 Hz, such as, for example, road noise, mechanical equipment noise particularly from multiple sources operating simultaneously, air flow, and many people talking in the acoustically reflective space.

Figure 1A:
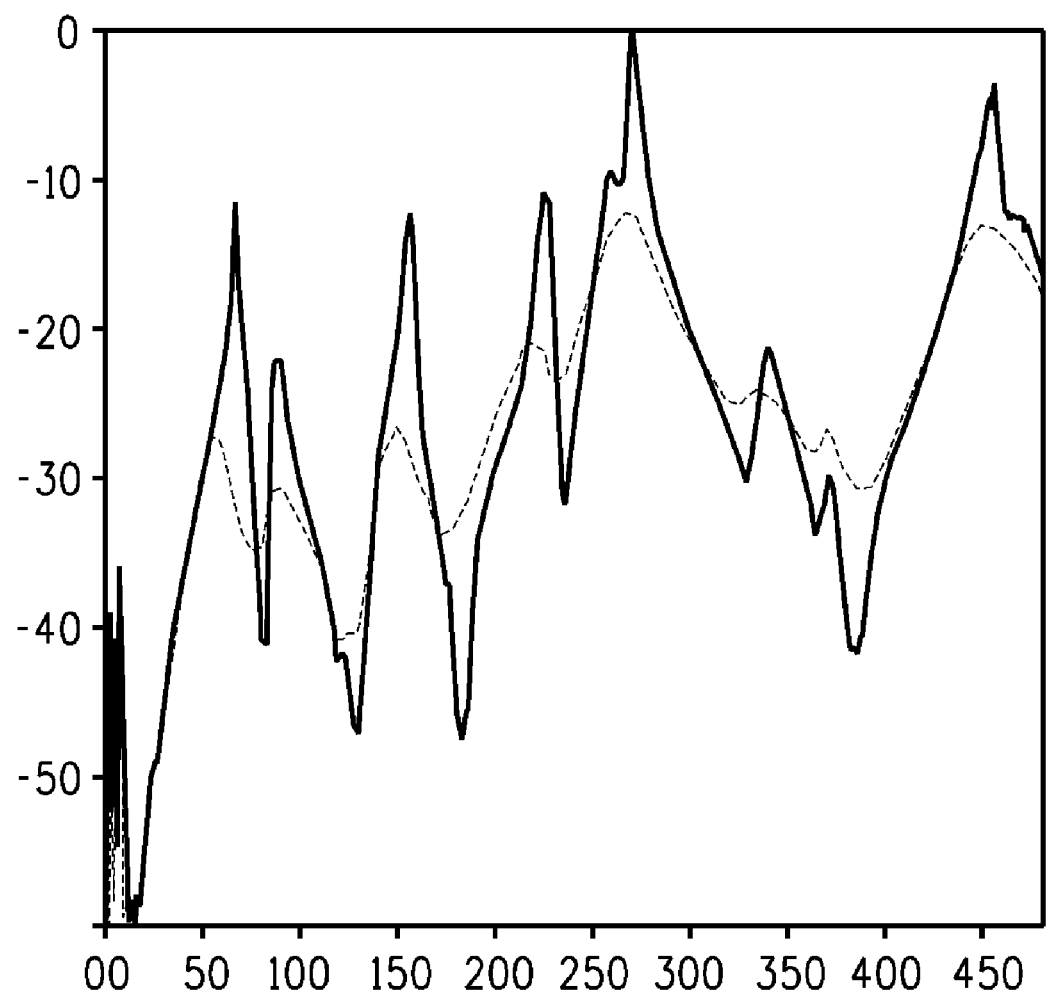
FIG. 1a illustrates the frequency response of a vibrating surface of a structure having well-spaced natural frequencies such that the structure is modally sparse.
Figure 1B:
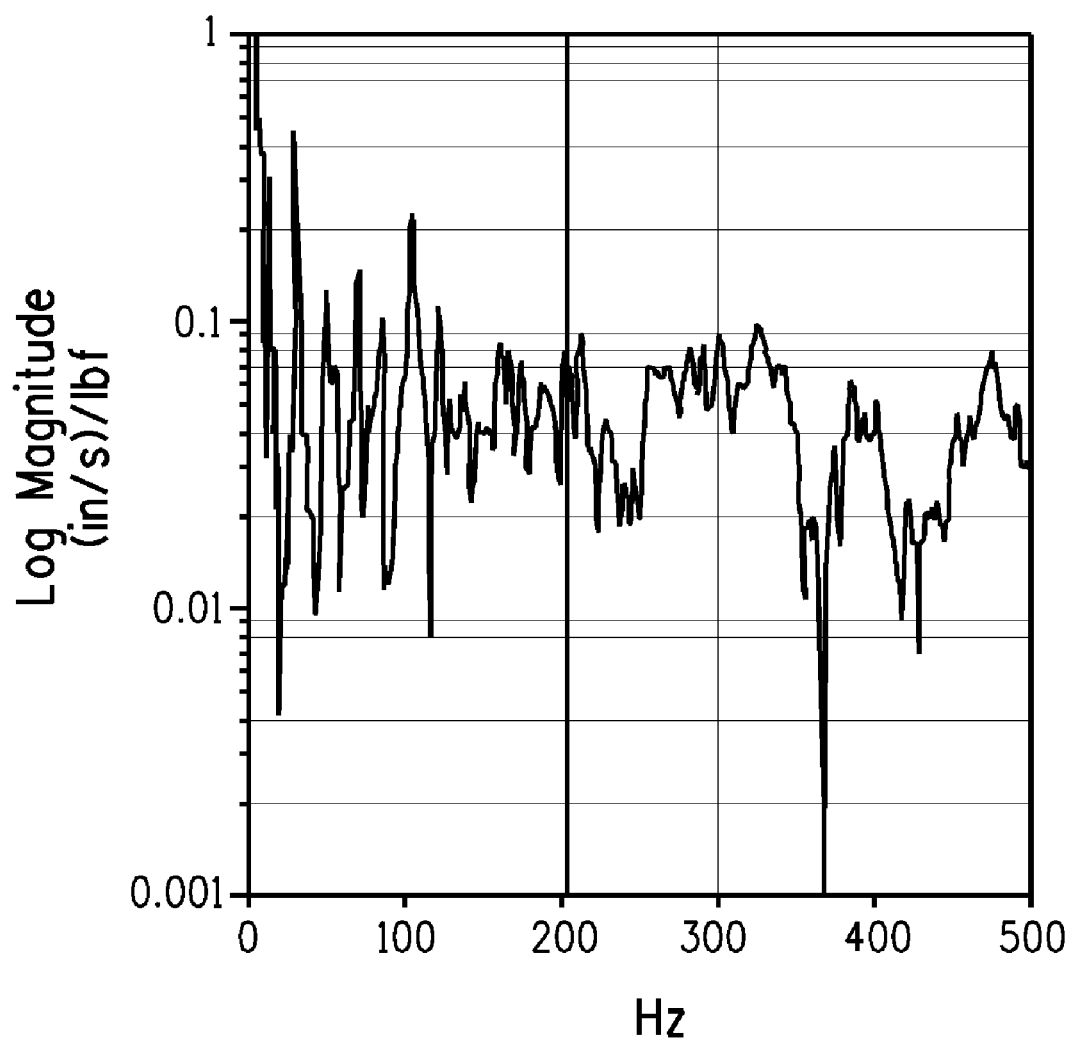
FIG. 1b illustrates the frequency response of a vibrating surface of a structure having closely spaced natural frequencies such that the structure is modally dense.
Figure 2:
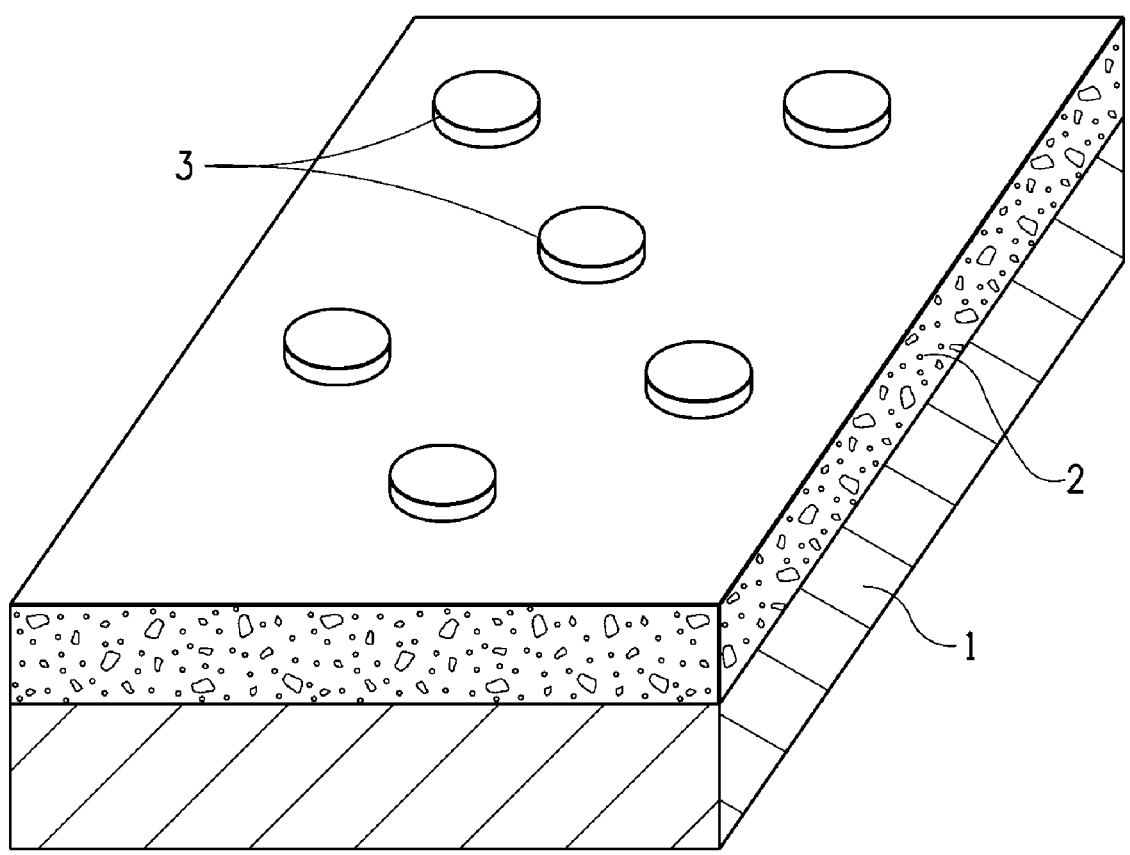
FIG. 2 illustrates an embodiment of the vibration absorber of the invention.

As shown in FIG. 2, one embodiment of the invention includes at least one viscoelastic layer 2 and at least one corresponding plurality or set of discrete mass elements 3 in contact with the viscoelastic layer 2. In this invention the term "viscoelastic" means material which exhibits both an elastic and a viscous component during material deformation. It does not relate to the form, geometry or porosity of the material, but rather is a property characterized by the ability of the material to react to external forces. As used herein, viscoelastic material can also be poroelastic.

The phrase "in contact with" includes the discrete mass elements being applied to the surface of the viscoelastic layer or embedded within the viscoelastic layer. The absorber is positioned over the surface of the vibrating structure 1. The inventive absorber can be flexible to conform to various surfaces including flat surfaces (such as walls, ceilings, partitions, panels and the like), as well as curved surfaces (such as pipes, drums, cylinders, curved walls and the like) and more complicated surface shapes (including wall cavities with studs). Because multiple modes can be addressed by a single absorber, the absorber is adaptable for use in many modally dense situations. The term "attenuation" is used herein to refer to a reduction in noise or vibration.

Passive methods of vibration and noise control of modally dense structures have been deemed ineffective at frequencies below 100 Hz and only partially effective at frequencies between 100 Hz and 500 Hz, especially when excited by a broadband excitation. Known TVAs can be tuned to only one frequency at a time, so multiple TVAs must be used in order to attenuate multiple natural frequencies. It is well known that a TVA works by splitting the unwanted resonant frequency peak into two peaks around the target resonant frequency at which the TVA is tuned. In modally dense structures, as described previously herein, the two newly created peaks at the frequencies below and above the target frequency can amplify the structural response at the two frequencies and lead to undesirable noise and/or vibration increase as a result.

Known TVAs are deemed to have no defined area of attachment, i.e., they are attached at a given point to the primary structure and tuning is carried out using the following equation, derived from Newton's Second Law of Motion:

$$\omega = (k/m)^{1/2} \quad (1)$$

wherein k represents the stiffness or spring constant of the spring component of the tuned vibration absorber, and m represents the mass component of the tuned vibration absorber.

For single degree-of-freedom TVAs, as is known to those skilled in the art, tuning is a relatively straightforward matter of identifying the target natural frequency to be attenuated, and selecting spring and mass components having the stiffness and mass needed to satisfy Equation 1 as well as to result in the desired resultant split frequency response. In order to select the mass needed to result in the desired mode split, the mass ratio must be considered. The mass ratio as generally known in the art is defined as:

$$\mu = m_2/m_1 \quad (2)$$

wherein $m_2$ represents the mass of the mass component of the absorber (i.e., the secondary mass); and $m_1$ represents the mass of the vibrating structure, also known as the primary structure (the primary mass).

According to the invention, tuning is accomplished by first identifying the multiple target natural frequencies or frequency range to be attenuated within a frequency range of interest in the vibrating structure. Next, the desired degree of splitting of the target natural frequencies and the corresponding mass ratios for each target natural frequency are determined.

A mass ratio is determined for each targeted natural frequency (i.e., each frequency specifically targeted for tuning, for reduction of sound or vibration at or near the target frequency) in the vibrating structure. According to the invention, the mass ratio is the ratio of the cumulative mass of all discrete masses that are tuned to the same target natural frequency to the effective mass of the vibrating primary structure at that natural frequency. Mass ratio $\mu$ at a given frequency $\omega_1$ is determined by the following equation:

$$\mu_{\omega 1} = \Sigma m_{2\omega 1}/m_{1\omega 1} \quad (3)$$

wherein:

$\Sigma m_{2\omega 1}$ represents the sum of all discrete mass elements (i.e., the secondary mass) tuned to a frequency $\omega_1$; and $m_{1\omega 1}$ represents the effective mass of the primary structure (i.e., the primary mass) vibrating at frequency $\omega_1$.

The effective mass of the primary structure is approximated by Z×M, wherein M represents the actual mass of the vibrating structure and Z is a scaling factor as defined by the boundary conditions of the structure. If the structure to be addressed has single degree of freedom motion, the scaling factor Z is 1 and the effective mass is equivalent to the actual mass. Effective mass for modally dense structures is complicated to calculate, as there are many modes to address and no Z scaling factors for such realistic situations readily available without experimental modal analysis. For a plate-like structure having more than single degree of freedom motion, such as a wall, the scaling factor can be approximated to be 0.5, since plate motions are uniformly split between antinodes, nodes, and in between, and thus like a beam, a plate has a Z of 0.5. Also, above the first mode, the plate has approximately equal numbers of positive and negative degrees of freedom.

The absorber of the invention can be tuned to various degrees of precision. In order to most precisely tune the absorber of the invention, in calculating mass ratio, the modal mass for each natural frequency targeted for tuning normalized by the amplitude of the mode shape can be used as the effective mass (herein referred to as "effective modal mass"). Effective modal mass is the mass a structure would have if the entire structure were treated like a single degree of freedom "mass-spring" system for a given excitation location at one of its resonant frequencies. Since effective modal mass differs for each frequency, the mass ratio $\mu$ in turn differs for each targeted natural frequency. Modal mass is determined via a commercially available modal analysis software program (such as, for instance, MEScope or Modal Plus). Using such a program, a modal survey is completed using a calibrated force to excite the structure and accelerometers to measure the response over the structural degrees of freedom of interest, i.e., at various points over the structure's surface. The eigenvalues (natural frequencies and damping ratios) are extracted for the frequency range of interest, and the eigenvectors (mode shapes) are extracted for each natural frequency. The software computes the residue for each mode shape and then computes the modal mass for each mode or frequency and degree of freedom (i.e., each location on the surface of the structure). The modal analysis was generated by MEScope, available from Bruel & Kjaer North America Inc of Norcross, Ga.

Figure 4:
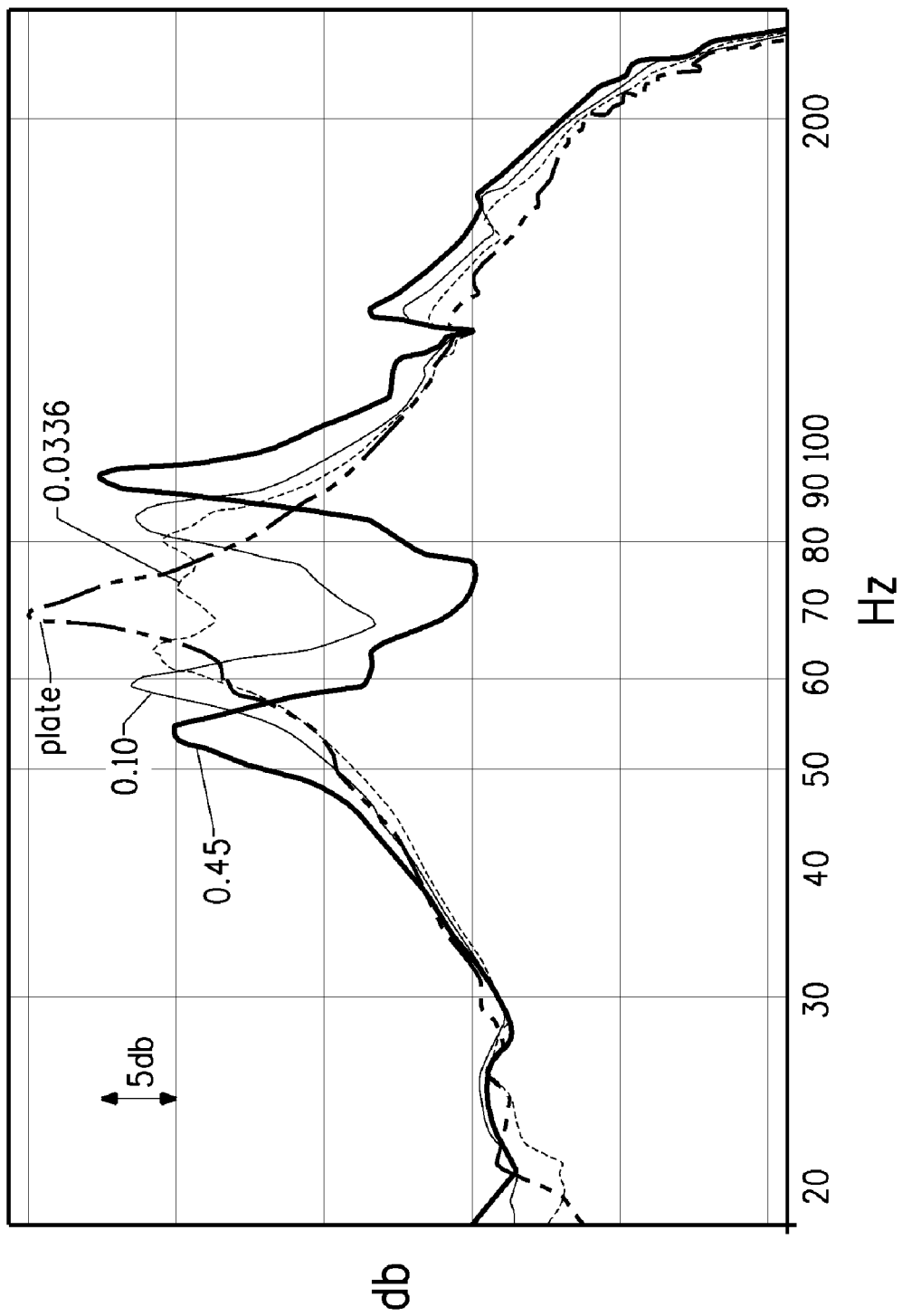
FIG. 4 illustrates the frequency response of a vibrating plate at a natural frequency with no vibration absorber applied, as well as with three alternative absorbers applied having three different mass ratios.

In some situations, it has been found to be preferable to tune using a very low mass ratio in order to minimize the formation of distinct split frequency peaks that could unintentionally and undesirably interact with pre-existing modes in the structure. As an illustration, when the mass ratio used to tune the absorber for a targeted natural frequency is greater than about 0.04 (4%), the peak at that frequency splits and two response peaks are generated at higher and lower frequencies. It has been found that when the mass ratio is less than about 0.04, the split is so modest that it appears as if only the amplitude of the response frequency is reduced. The original frequency does in fact split, but the split frequencies are close to one another, broad in amplitude, and overlap. FIG. 4 illustrates frequency response at mass ratios of less than and greater than 0.04. The natural frequency being targeted is 68 Hz. Three absorbers using three mass ratios are demonstrated, $\mu=0.45$ (using 27 mass elements having a mass of 26.2 g each with a mass contact area of 4.85 cm$^2$), $\mu=0.10$ (using 6 of the mass elements), and $\mu=0.0336$ (using 2 of the mass elements). As can be seen, only at $\mu=0.0336$ is there attenuation with no formation of two distinct peaks. For this reason, it can be beneficial to use low mass ratios when tuning the absorber of the invention in order to avoid unintentional and undesirable interactions with pre-existing structural modes.

Alternatively, in some situations in which many nearby modes over a frequency range are each split into two distinct modes that appear as peaks on the plot of frequency response, the net effect can be an improvement in overall attenuation over the frequency range in question. In these situations, it can be desirable to tune the absorber using mass ratio higher than 0.04. With many mass ratios, the split frequencies will interact with the pre-existing modes in such a way as to lower the overall response. When a number of modes are split in a given frequency range, the resulting structural response is a superposition of all the new modes. If all of the pre-existing natural modes are reduced through the use of the absorber, this superposition results in a lower structural response than the frequency response of the pre-existing structure without the absorber.

Rather than using simply the mass of the discrete mass elements of the tuned vibration absorber and simply the stiffness of the spring component (i.e., the viscoelastic layer) of the tuned vibration absorber, surprisingly, it has been found to be important to take the attachment geometry of the vibration absorber into account, in other words, the geometry of the spring component and the discrete mass elements as they relate to one another. In particular, the contact area over which the discrete mass elements contact the spring component has been found to be an important factor to take into consideration in tuning the vibration absorber of the invention. The behavior of vibration and/or acoustic radiation of a structure utilizing an absorber according to the invention is more closely predicted by the following equation than by Equation 1:

$$\omega = (k^*/(m/A))^{1/2} \quad (4)$$

wherein:

ω is frequency of the vibration or acoustic radiation (in units of rad/s);

m is the mass of the mass component of the system, i.e. each of the discrete mass elements (in units of grams);

A is the contact area between each mass element and the viscoelastic layer (in units of $cm^2$) (also referred to herein as "mass contact area" or "contact area"); and k* is the normalized dynamic stiffness of the spring component of the system, i.e. the viscoelastic layer (in units of $N/cm/cm^2$), which is defined as the dynamic stiffness of the spring component normalized by dividing by the mass contact area (k/A).

Figure 3:
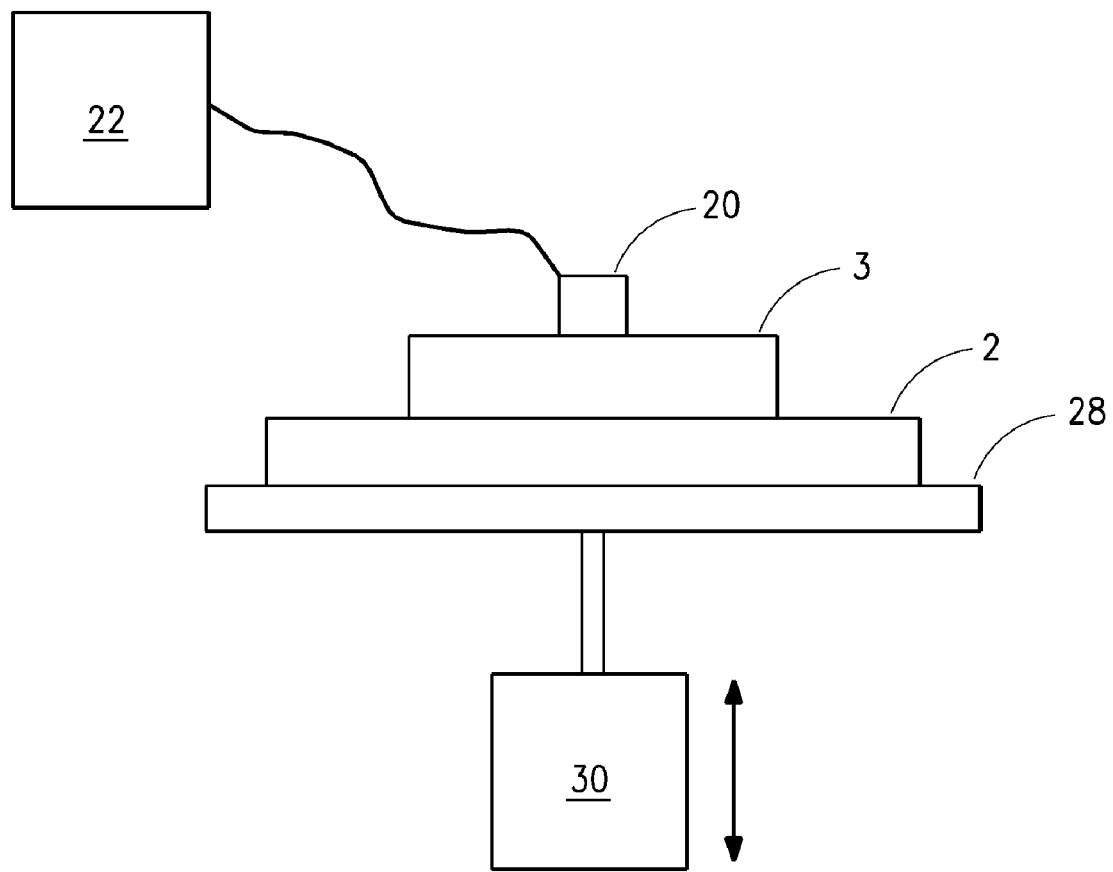
FIG. 3 illustrates the test set-up for use in the dynamic shaker test.

The dynamic stiffness is determined in a dynamic shaker test using the test set-up as depicted in FIG. 3. An accelerometer 20 or optical probe (not shown) can be used to detect the mass element displacement/acceleration to be converted to the resonant frequency by frequency analyzer 22 and used with the test set-up including the discrete mass element 3, the viscoelastic layer 2 and a support platen 28 on a shaker 30 to measure the frequency of the system of the test set-up. The dynamic stiffness of the spring component used in the test set-up is then determined according to the following equation (obtained by rearranging the Equation 1):

$$k = m\omega^2$$

It has been found to be important to empirically determine the stiffness of the spring component using the dynamic shaker test since the typical force/deflection behavior for the viscoelastic layer in the absorber of the invention is highly dependent on a number of variables including the position at which the deflection is taken, the degree of pre-compression or pre-tension of the spring component, and the mass contact area and/or contact geometry (actual shape of the contact area).

It has been found that it is not possible to accurately and reliably tune an absorber to target closely spaced natural frequencies in modally dense structures based only on Equation 1. This is illustrated from the data in Table 1.

TABLE 1

| Weight of mass element (g) | Area of contact ($cm^2$) | Weight per unit contact area ($g/cm^2$) | Frequency (Hz) | | |
|---|---|---|---|---|---|
| | | | Calculated by Eq. 1 | Calculated by Eq. 4 | Measured |
| 4.43 | 2.52 | 1.76 | — | — | 220 |
| 4.06 | 4.51 | 0.90 | 230 | 320 | 311 |
| 3.64 | 0.82 | 4.43 | 242 | 138 | 139 |
| 83.10 | 22.2 | 3.74 | 51 | 155 | 140 |

As can be seen from this data, frequency, as predicted by Equation 1 can deviate from the measured frequency by as much as a factor of 3. Unexpectedly, different absorbers using different mass elements having substantially equivalent mass but having different mass contact areas have been found to exhibit frequencies varying by more than a factor of 2; while different absorbers using different mass elements in which one mass element has 23 times the mass of the other mass element were shown to exhibit the same natural frequencies (at equivalent stiffness). Despite widely varying mass and contact areas, if the ratio of mass to contact area is close, the natural frequency addressed by the mass elements is also close provided the normalized dynamic stiffness of the viscoelastic layer is constant.

The absorber of the invention includes at least one viscoelastic layer for distribution over the surface of the vibrating structure. In the subject invention, the term "distribution", "distributed over" and other like forms of the terms shall encompass the meanings in the following sentences of this paragraph. The absorber either can cover all or a substantial part of the vibrating structure. The inventive absorber can be continuously or partially adhered or mechanically point attached to the structure or have any other physical contact arrangement with respect to the structure. One skilled in the art will understand that many other methods of attachment can be used.

The material selected for use as the viscoelastic layer has an appropriate stiffness relative to the targeted natural frequency and can accommodate the cumulative mass of the mass elements for a given application. The viscoelastic layer also should provide unchanged stiffness during the material lifetime to ensure stable performance. The shear strength of the absorber's viscoelastic layer can be important in some applications, as the viscoelastic layer should support the weight of the discrete mass elements once installed, either vertically or horizontally, against gravity without delaminating, sagging, changing stiffness or dimensionally distorting. Vibration absorbers to be applied to building partitions and other modally dense structures to control vibration and/or noise at low frequencies, i.e., below 500 Hz, have significant total mass. A viscoelastic layer material with low shear strength will sag or delaminate under gravity, particularly when the absorber is installed vertically. Examples of suitable material for use as the viscoelastic layer include open and closed cell foams such as melamine, silicone, polyolefin and polyurethane foams, and various fibrous materials made from organic or inorganic fibers and combinations thereof, as well as films, polymer sheets, or any materials and structures exhibiting spring like properties needed to support mass elements resonance while in contact. The viscoelastic layer can optionally include additional layers such as films, scrims, membranes or metal layers. The viscoelastic layer can be homogeneous or heterogeneous material.

The absorber of the invention includes a plurality of spaced discrete mass elements in contact with the viscoelastic layer. Each discrete mass element is tuned to a target natural frequency w of the vibrating structure in accordance with the equation as described above. The mass components are selected based on the solutions of Equations 3 and 4 herein. Equation 3 (mass ratio) is solved for the secondary mass, i.e., the cumulative mass of the discrete mass elements tuned to the same frequency. After having selected a viscoelastic layer for use in the absorber, Equation 4 can be solved for m/A.

The mass elements may be attached to the viscoelastic layer by any known means, including by gluing or mechanical attachment, etc. They can also be embedded in the viscoelastic layer or located between multiple adjacent viscoelastic layers. The discrete mass elements are preferably placed at the locations of relatively low effective modal mass for a given mode. At nodal regions, where the motion for a particular mode is zero or very small, the effective modal mass becomes very large, and therefore placement of mass elements at these locations would have little effect.

The mass elements can be all made from the same material or different materials. The material of the mass elements is preferably noncorrosive or not exhibiting any other adverse effects in the environment in which the absorber will be used and compatible with other materials in contact. The mass elements can be made from a flexible material in order to fit odd shape vibrating structures such as curved equipment covers, pipes, etc. The mass elements can have various shapes and sizes. For many applications such as use covering a two-dimensional wall or circular shape like pipe, the mass elements can be relatively flat and small for the composite to be thin, flexible and conformable to various surfaces. The mass elements can conveniently be, for example, flat solid elements, disks, donut shapes, etc. It has been found that by the use of individual mass elements having extremely small mass, such that the cumulative mass ratio µ of all mass element tuned to the same frequency is less than about 0.04 as described above, undesirable peak splitting can be avoided. Each mass element has a mass less than about 50 g, even between about 1 g and 20 g. The ($m_2$/A) ratio can be less than 5 g/cm$^2$. The mass elements are selected for their response frequency according to Equations 3 and 4 above, to substantially match a target natural frequency present in the vibrating structure. The use of mass elements that provide absorber frequencies substantially equivalent to target natural frequencies present in a structure results in an absorber effective at absorbing the target vibration and/or noise emanating from the structure.

The mass of the mass elements, the mass contact area, and/or the stiffness of the viscoelastic layer can be varied within an absorber according to the invention in order to target multiple natural frequencies in the structure. In a conventional vibration absorber, one skilled in the art would tune the absorber by adjusting the absorber stiffness k, and the absorber mass m according to Equation 1. According to the invention, in order to tune the absorber to attenuate several unwanted resonances within a frequency range between $\omega_{low}$ and $\omega_{high}$, absorber normalized dynamic stiffness $k^*_{low}$ (usually a relatively constant value for a homogeneous material) and absorber mass $m_{2,low}$ are initially selected to address the lowest frequency of interest in accordance with the Equation 4: $\omega_{low}=(k^*_{low}/(m_{2,low}/A))^{1/2}$. Variation is then introduced to the mass, contact area and/or stiffness.

Assuming constant absorber stiffness and constant contact area, the variation needed in mass of the mass elements of the absorber resulting in an absorber effective over the range between $\omega_{low}$ and $\omega_{high}$ is calculated, recognizing from Equation 4 that with constant absorber stiffness and contact area, $(\omega_{low}/\omega_{high})^2=m_{2,high}/m_{2,low}$, it is possible to solve for $m_{2,high}$. Discrete mass elements can be included in the absorber having the same contact area and a mass varying between mal and $m_{a2}$, thereby addressing the frequency range from $\omega_{low}$ and $\omega_{high}$ with the absorber. Multiple sets of discrete mass elements tuned to the multiple target natural frequencies of the vibrating structure can be used in the absorber to provide broadband vibration and/or noise reduction.

Similarly, as recognized in Equation 4, contact area has an effect on the resonant frequency, that is, $\omega^2=k^*/(m_2/A)=A \times k^*/m_2$, wherein A is the mass contact area between each mass element and the viscoelastic layer. By varying the contact area of the mass elements over a range of areas, it is possible to address a range of frequencies. Mass and contact area can be varied simultaneously by including mass elements of varying sizes and shapes on the viscoelastic layer, as illustrated in FIG. 2.

In order to determine the variation needed in the stiffness of the viscoelastic layer resulting in an absorber effective over the range between $\omega_{low}$ and $\omega_{high}$, recognizing from Equation 4 for constant mass and area, that $(\omega_{low}/\omega_{high})^2=k_{low}/k_{high}$ or $(\omega_{low}/\omega_{high})=(k_{low}/k_{high})^{1/2}$, it is possible to solve for $k_{high}$. The viscoelastic layer of the absorber can then be modified or designed so that the layer stiffness varies between $k_{low}$ and $k_{high}$. In this way, the frequency range from $\omega_{low}$ and $\omega_{high}$ can be addressed by the single absorber.

Figure 9:
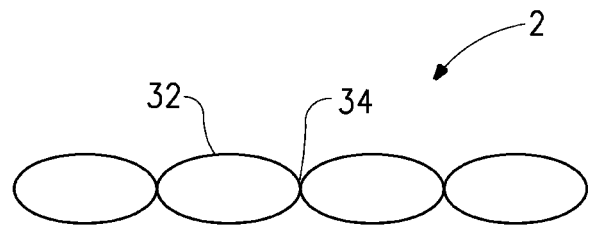
FIG. 9 illustrates a viscoelastic layer for use in the absorber of the invention having a pattern of stiffness variation.

Various means to impart variable stiffness within a single viscoelastic layer can be employed. For many applications, it is beneficial to vary the local stiffness spatially in a repeating pattern. This stiffness variation can be accomplished by means for varying the layer thickness so that the homogeneous viscoelastic layer has relatively thicker portions and thinner portions, such as viscoelastic layer cross sectional profile forming by cutting, layering, lamination, physical deposition, etc. Means for varying the layer thickness and density include quilting, stitching, pinning and the like, and any other means of forming the viscoelastic layer with a cross-sectional profile in a particular pattern. FIG. 9 illustrates the cross section of quilted viscoelastic layer 30 resulting in thicker portions 32 and thinner and denser portions 34 of the layer, wherein portions 34 have greater stiffness. Alternatively, the stiffness can be varied locally to form a heterogeneous material without changing the layer thickness by means of chemically or mechanically stiffening the viscoelastic layer. Chemical stiffening might result in local chemical structure alteration, such as by chemical fusion, impregnation, or densification. One means of varying the stiffness of a foam viscoelastic layer is by mechanical crushing the foam cell struts in a pattern to create a desired spatial stiffness distribution. Examples of physical stiffening include local change of properties as a result of localized polymerization, cross-linking, etc. under irradiation of energy, such as heat, UV, X-ray, IR, etc. Combinations of the above means are also possible. It can be further accomplished by laminating the structure with another layer or by adding stiffening layers. At the regions of the viscoelastic layer having lower stiffness, lower natural frequencies can be absorbed, while simultaneously, at the regions of the viscoelastic layer having higher stiffness, higher natural frequencies can be absorbed.

Combinations of variation in mass of the mass elements, mass contact area and/or stiffness of the viscoelastic layer can be employed simultaneously in the absorber resulting in variation in frequency of the absorber in order to address a frequency range of interest.

According to one embodiment of the invention, the absorber of the invention can be designed and tuned precisely to realize improvement in vibration and acoustic radiation attenuation at specific natural frequencies within a modally dense structure. In this embodiment, the natural frequencies of the structure are first analyzed so that the amplitude of the sound pressure level is known over the frequency range of interest and the mode shapes at each frequency are known spatially over the surface of the structure. At least two specific natural frequencies are selected to be attenuated. Based on these selected frequencies, the viscoelastic layer stiffness and the mass and contact area of the discrete mass elements are determined using Equations 3 and 4. Based on the knowledge of the spatial location of the nodes and anti-nodes as determined by modal analysis, the discrete mass elements are applied to the viscoelastic layer preferably at and near the anti-nodes for maximum effect. The nodes are preferably avoided according to this embodiment, as mass applied at the nodes has no effect on the vibration and acoustic radiation from the structure.

According to another embodiment of the invention, the absorber of the invention is designed to realize improvement in vibration and acoustic radiation attenuation over a range of natural frequencies within a structure, rather than at specific natural frequencies. This approach is less precise than targeting and tuning for specific natural frequencies; however, through the use of variation in mass of the mass elements, variation in the mass contact area, and/or variation in the stiffness of the viscoelastic layer as previously described, vibration and acoustic radiation at multiple natural frequencies can be attenuated with a single absorber utilizing a single viscoelastic layer. In this embodiment, a complete study of the modes present in the structure is not necessary. Rather, a frequency range of interest is identified. The viscoelastic layer and the size and shape of the discrete mass elements are selected. The mass elements are placed over the surface of viscoelastic layer. While some mass elements may be placed in locations where they are ineffective, i.e., at or near nodes, this embodiment is economical to produce and has been found to be effective at attenuating vibration and acoustic radiation even at low frequencies. The mass elements can be placed on the viscoelastic layer at a distance of, for instance, at least 1.5 cm apart from each other. It is recognized that space on or in the viscoelastic layer is limited; therefore the ratio of the mass of each discrete mass element to the contact area can be, for instance, less than 5 g/cm$^2$ in order to practically place many mass elements on or in the same viscoelastic layer.

In many modally dense structures, such as walls, low frequency vibration and acoustic radiation in particular has remained difficult to eliminate or reduce significantly employing passive control methods. The absorber of the invention has been found effective at reducing vibration and noise radiation at frequencies in the audible range, and at low frequencies including less than about 1000 Hz, even less than about 500 Hz, and even less than about 350 Hz. Various methods can be employed to demonstrate the improvement of the absorber of the invention. According to one approach, when the structure is excited by a broadband input excitation, the response function has lower sound pressure level (SPL) or lower mechanical vibration at the frequencies within the narrowband spectrum over some frequency range of interest. The invention is useful to improve the narrowband frequency response function spectrum continuously over some portion of an octave frequency range, e.g., for instance over approximately a ⅓ octave band range. For instance, if the octave in question is between 125 Hz and 250 Hz, a continuous reduction in SPL could be achieved between 125 Hz and 157 Hz, the first one-third octave band.

According to another method of defining the improvement, the vibration and acoustic absorber reduces the overall level of noise and/or vibration by at least 1 dB (A-scale) integrated at the frequencies below about 4000 Hz, when compared to the prior art.

According to another method of defining the improvement, the vibration and acoustic absorber reduces the overall level of noise and/or vibration by at least 3 dB (A-scale) integrated at the frequencies below about 4000 Hz. The improvement is determined by comparing the frequency response for the structure employing the absorber of the invention and the frequency response for the structure without the absorber.

According to another method of defining the improvement, the frequency responses for comparison purposes can be recorded with narrowband spectral data, or alternatively, using data which has been evaluated with a 1/12 or ⅓ octave band analysis as determined on a frequency spectrum analyzer. When trying to determine whether there is continuous improvement over a frequency range, it may be convenient to compare data (the SPL, TL or mechanical vibration) of the structure using an absorber according to the invention to the data of the structure without an absorber according to the invention within each band using the computed ⅓ or 1/12 octave band data. The improvement is considered continuous when there is an improvement of at least 1 dB at any 3 adjacent 1/12 octave bands and at least 1 dB at any 2 adjacent ⅓ octave bands. Alternatively, the frequency response function can be collected with the octave bands data analysis and is considered continuous when there is an improvement of at least 1 dB at any two adjacent octave bands.

The absorber of the invention can also include multiple, alternating layers of viscoelastic layers and pluralities of discrete mass elements corresponding and in contact with the viscoelastic layers. Each absorber layer having a single viscoelastic layer and corresponding plurality of discrete mass elements can be tuned to the natural frequencies present in a separate frequency range or band. The means described herein of varying mass, contact area and/or stiffness can vary from layer to layer. For instance, mass elements can be placed on one viscoelastic layer along the anti-node lines for one mode, while on another viscoelastic layer of the absorber; the mass elements can be placed along anti-node lines for another mode to be attenuated.

In all of the embodiments disclosed herein, an increase in damping in the absorber of the invention is beneficial to reduce noise transmission. Significant reductions in resonant response are possible with damping ratios of 1%, even 5%, even 10% and higher. Typical known damping ratios for the viscoelastic layer are between about 0 and about 0.5 (50%).

The absorber of the invention is suitable for use on vibrating surfaces from which vibration emanates, such as, for example, walls, partitions, ceilings, floors, curtains, equipment enclosures (including housings for pumps, compressors, motors, engines, cams and so on), insulating panels, industrial noise barriers, road noise barriers, tents, automotive noise barriers, and sound barriers on trains and military vehicles. The absorber of the invention can also effectively be used on portions of such surfaces. The absorber material is easily cut to size and installed. The absorber can be installed over various shapes including curved surfaces and pipes. The inventive absorber can be combined with other noise reduction methods, such as absorbers, barriers, and dampers.

EXAMPLES

Example 1

An absorber according to the invention was formed using a layer of open cell melamine foam (white Willtec® foam from Illbruck Acoustic Inc., Minneapolis, Minn.) having a patterned stiffness variation developed by quilting. The original melamine foam layer was 13 mm thick with a basis weight of 9.4 kg m$^3$, 120 rayls specific air flow resistance, and relatively constant average normalized dynamic stiffness k* of 3,500 N/m/cm$^2$ (determined using the test set up described herein and illustrated in FIG. 3). The foam was quilted with a 0.1 mm thick, 17 g/m$^2$ basis weight nylon 6,6 spunbond scrim on both sides of the foam. A pattern of approximately 11 cm×11 cm diamonds was quilted into the foam, with a resultant thickness varying from 6 mm to 13 mm.

Mass elements for use in the example absorber were flat zinc coated steel disks of outer diameter of 2.54 cm with a hole in the middle and cross section area of 3.35 cm$^2$. The ratio of the individual mass element weight to the mass contact area was varied by varying both mass of the individual mass elements and the cross-sectional area of mass elements. The weight of the mass elements was varied between 4.65 g and 6.6 g, with a mean weight of 5.69 g (standard deviation of 0.45). The mass elements were distributed over the surface of the quilted melamine foam layer in the following pattern: 3 mass elements per quilted diamond near three of the four diamond corners. The distance from the mass elements to the stitch lines was varied. The closest distance between the edges of two adjacent mass elements was about 2 cm for a resultant density of the mass elements of 1.07 kg m².

The example absorber was made by the lamination process described below. A vinyl acetate water based glue (WA 2173 available from efi Polymers, Denver, Colo.) was applied by a roller onto one surface of the quilted melamine foam layer at a rate of approximately 0.3 kg/m². The mass elements were placed on the glue layer, and a nonwoven layer was placed over the mass elements. The nonwoven layer was a melt blown polypropylene layer having 13 mm thickness, 0.2 kg/m² basis weight, and 94 rayls specific air resistance (SP-500 available from Kimberly Clark, Dallas, Tex.). The glue was then used to laminate an additional quilted melamine foam layer to the nonwoven layer, and subsequently to laminate a non-reinforced, 3 mm thick vinyl loaded limp mass barrier having a basis weight of 1 lb/ft² (4.9 g/m²) to the additional foam layer. The resultant absorber was about 38 mm thick and had the following bottom to top structure: quilted foam, mass elements, nonwoven layer, quilted foam, limp mass barrier. The total basis weight of the absorber was 7.66 kg m² and the total size of the absorber was 2.44 m by 2.44 m.

A comparative absorber was prepared similarly, but without mass elements. The total basis weight of the absorber was 6.34 kg m².

The example absorber and comparative absorber were conditioned at room temperature for at least 2 weeks after manufacturing. Additionally, the absorbers were conditioned at the controlled room atmosphere (T=23° C. and RH=60%) for 24 hrs before acoustic testing. The frequency response data in the form of narrowband of the sound pressure level (SPL) (1 Hz sampling resolution) data was obtained using a laboratory setting including a reverberant source room and a reverberant receiving room combination in compliance with ASTM E 90. The comparative and inventive absorbers were affixed by screws to a test frame and then firmly attached to an aluminum plate (having dimensions of 2 mm by 2.44 m by 2.44 m and total weight of 32 kg) on the receiving room side using spray glue (3M 77) with the quilted foam layer in firm contact with the plate surface. The mass barrier layer surface of the absorber was exposed to the receiving room. The aluminum plate was inserted vertically into the frame of the test opening in between a source and a receiving room with a neoprene gasket to decouple from the frame. The edges were sealed to prevent the flanking noise. The excitation used for the test was a broadband white noise created the source room. The microphone was installed in the middle of the receiving room to collect the panel frequency response function (FRF), which in this case was sound pressure level narrowband data with 1 Hz resolution.

Figure 5:
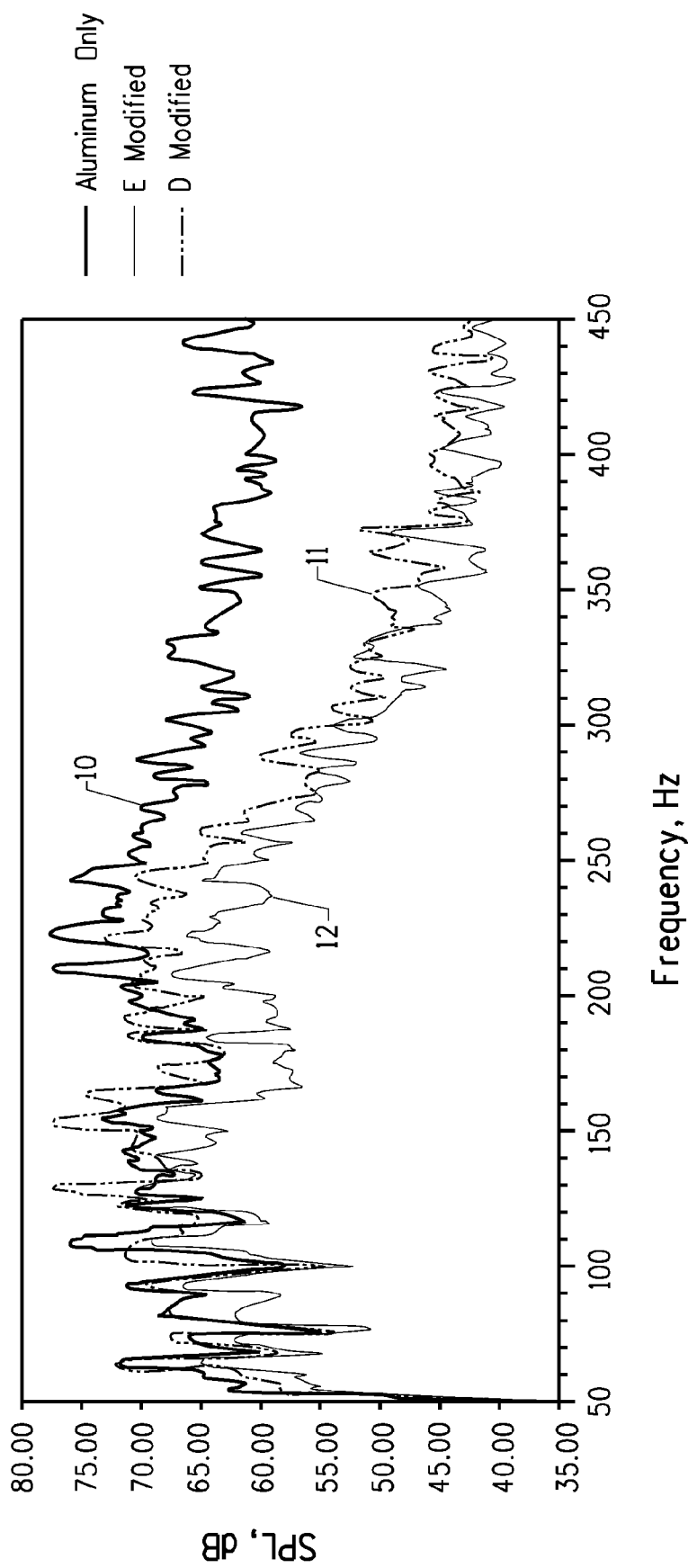
FIG. 5 illustrates the frequency response (narrowband data) of a vibrating aluminum plate over a frequency range of 50 Hz to 450 Hz, with no vibration absorber applied as well as with a vibration absorber according to the prior art and a vibration absorber according to the invention.

As can be seen from FIG. 5, the frequency response function spectrum of the vibrating aluminum plate (line 10) is modally dense in the frequency range presented here (50 Hz to 450 Hz). FIG. 5 compares the frequency response of the aluminum plate with no vibration absorber applied (line 10), the plate with the comparative absorber (line 11) and the plate with the example absorber according to the invention (line 12). The example absorber provides a continuous improvement of 3-10 dB in SPL narrowband data as compared with the comparative example over the frequency range from 100 Hz to 280 Hz.

Figure 6:
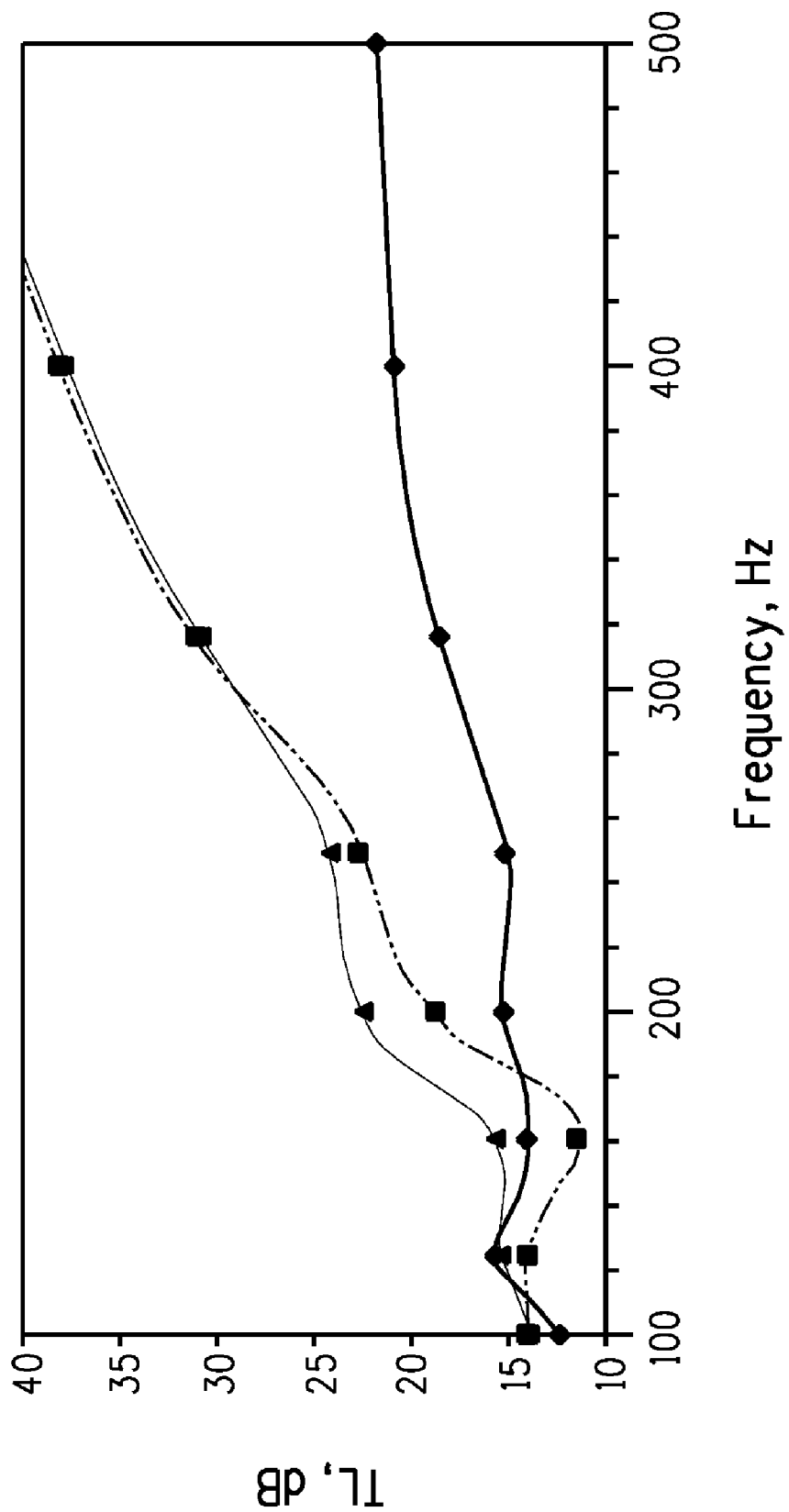
FIG. 6 is a plot of ⅓ octave band data illustrating the frequency response of a vibrating aluminum plate over a frequency range of 100 Hz to 500 Hz, with no vibration absorber applied as well as with a vibration absorber according to the prior art and a vibration absorber according to the invention.

FIG. 6 shows transmission loss (TL) data for the same experiment, but with data taken in ⅓ octave bands. It can be seen that example absorber (line 12) provides continuous TL improvement of 3-5 dB as compared with the comparative absorber (line 11) over the frequency range from 100 Hz to 250 Hz.

Example 2

An absorber according to the invention was formed using a layer of open cell melamine foam (white Willtec® foam from Illbruck Acoustic Inc.) as in Example 1, the foam layer having a normalized dynamic stiffness k* of 3,500 N/m/cm².

Mass elements for use in the example absorber were flat zinc coated steel disks of outer diameter of 25 cm with a small hole in the middle and cross section area of 4.85 cm². The ratio of the individual mass element weight to the mass contact area was varied by varying the mass of the individual mass elements. Three sets of mass elements having the same cross section area and different masses were selected. One set of mass elements had a mean weight of 6 g (standard deviation of 0.1) and a mass ratio $\mu_1$ of 0.0245; one set of mass elements had a mean weight of 12 g (standard deviation of 0.6) and a mass ratio $\mu_2$ of 0.0245; and one set of mass elements had a mean weight of 18 g (standard deviation of 0.03) and a mass ratio $\mu_3$ of 0.0203. The mass ratios were calculated using the total weight of the aluminum plate as the primary mass. The mass elements were distributed over the surface of the melamine foam layer along vertical rows of the same weight mass elements in the following alternating sequence: 6 g-12 g-6 g-18 g-6 g-12 g. The distance between centers of the neighboring mass elements was 102 mm in horizontal and vertical directions. The closest distance between the edges of two adjacent mass elements was about 76 cm for a resultant density of the mass elements of 0.92 kg m².

The example absorber was made by the lamination process described below. A 0.1 mm thick, 17 g/m² basis weight nylon 6,6 spunbond scrim was placed on top of the foam. A vinyl acetate water based glue (WA 2173 available from efi Polymers) was applied by a spray onto one surface of the foam with a scrim at a rate of approximately 0.05 kg/m². The mass elements were placed on the glue layer, and a nonwoven layer was placed over the mass elements. The nonwoven layer was a melt blown polypropylene layer having 13 mm thickness, 0.2 kg/m² basis weight, and 94 rayls specific air resistance (SP-500 available from Kimberly Clark, Dallas, Tex.). The glue was then used to laminate a non-reinforced 3 mm thick vinyl loaded limp mass barrier (1 psf-4.9 g/m²) to the nonwoven layer. The resultant absorber was about 25 mm thick and had the following bottom to top structure: foam, mass elements, nonwoven layer, limp mass barrier. The total basis weight of the absorber was 6.88 kg/m² and the total size of the absorber was 2.44 m by 2.44 m.

A comparative absorber was prepared similarly, but without mass elements. The total basis weight of the absorber was 5.95 kg/m².

The example absorber and comparative absorber were conditioned and frequency response data in the form of narrowband of the sound pressure level (SPL) (1 Hz sampling resolution) data was obtained as described in Example 1.

Figure 7:
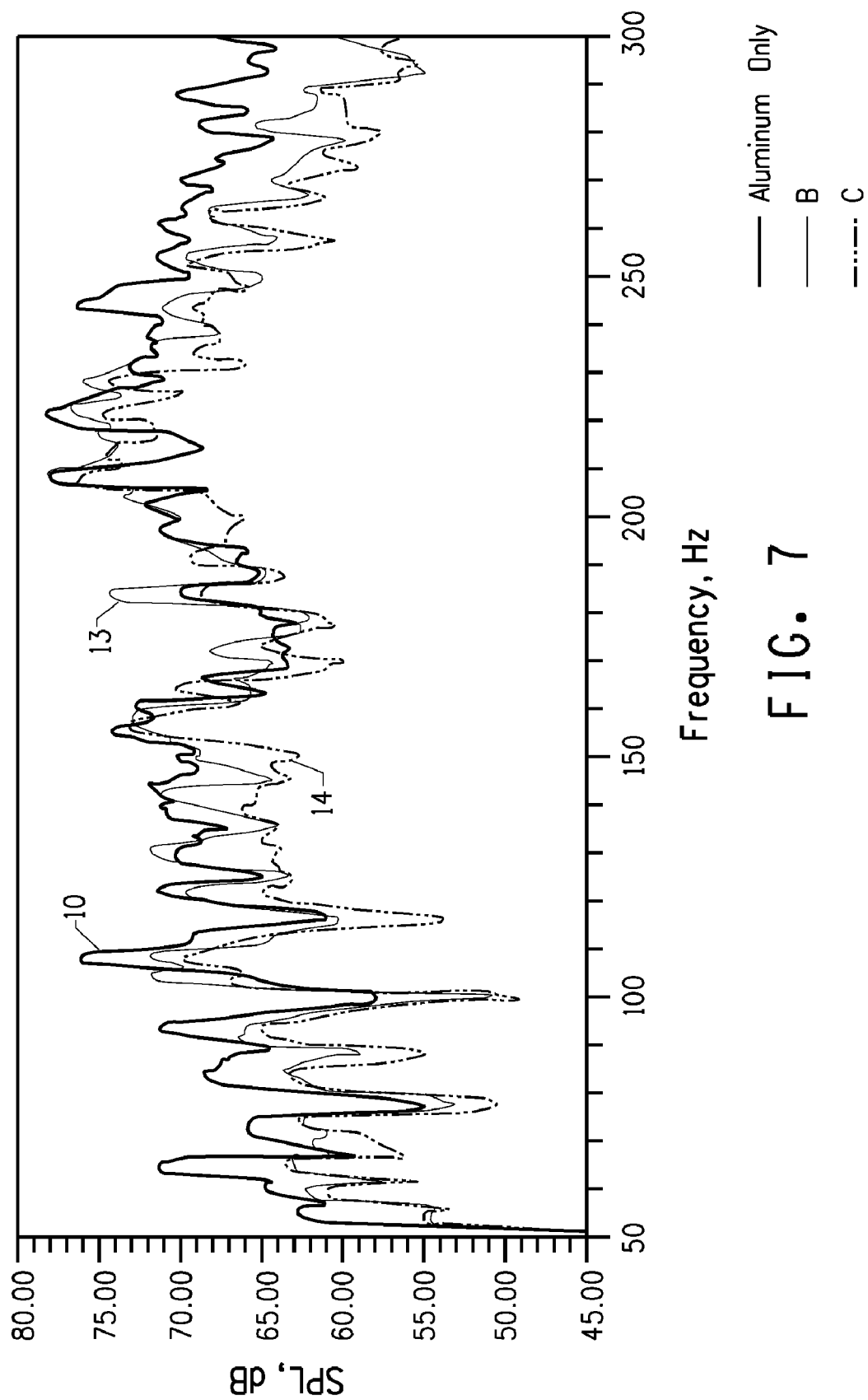
FIG. 7 illustrates the frequency response (narrowband data) of a vibrating aluminum plate over a frequency range of 50 Hz to 300 Hz, with no vibration absorber applied as well as with a vibration absorber according to the prior art and a vibration absorber according to the invention.

FIG. 7 illustrates the improved performance of the absorber of the invention (14) in terms of SPL narrowband data over the frequency range between about 50 Hz and about 160 Hz when compared to the frequency response of the aluminum plate (10) without the absorber and the improved performance of the absorber of the invention (14) in terms of SPL narrowband data over the frequency range between about 80 Hz and about 160 Hz when compared to the frequency response of the aluminum plate with the comparative absorber (13).

Example 3

An absorber according to the invention was formed having two viscoelastic layers and two corresponding sets of mass elements in contact with both viscoelastic layers. The absorber was adapted to a modally dense wall having studs spaced 40.64 cm apart. The first viscoelastic layer was formed from the foam layer used in Example 1. The foam was quilted with a spunbond scrim on both sides of the foam as described in Example 1.

Two sets of mass elements were selected for use in contact with the first viscoelastic layer. The first set was flat zinc-coated steel disks having an outer diameter of 2.54 cm with a hole in the middle and cross section area of 3.35 $cm^2$. The ratio of the individual mass element weight to the mass contact area was varied by varying both mass of the individual mass elements and the contact area of mass elements. The weight of the mass elements was varied between 4.65 g and 6.6 g, with a mean weight of 5.69 g (standard deviation of 0.45). The second set of mass elements was steel discs having an outer diameter of 25.4 mm with a small hole in the middle and cross section area of 4.85 $cm^2$. The weight of the mass elements was varied between 19.0 g and 19.6 g, with a mean weight of 19.4 g (standard deviation of 0.14). The mass elements were distributed over the surface of the quilted melamine foam layer in 12 vertical rows over 1.32 m foam width.

The second viscoelastic layer was formed using a layer of open cell melamine foam (grey Willtec® foam from Illbruck Acoustic Inc.). The melamine foam layer was 13 mm thick with a basis weight of 9.4 $kg/m^3$, 170 rayls specific air flow resistance, and relatively constant average normalized dynamic stiffness $k^*$ of 870 $N/m/cm^2$.

Two sets of mass elements were selected for contact with the second viscoelastic layer. The first set was flat zinc-coated steel disks having an outer diameter of 2.54 cm with a hole in the middle and cross section area of 3.35 $cm^2$. The ratio of the individual mass element weight to the mass contact area was varied by varying mass of the individual mass elements. The weight of the mass elements was varied between 3.2 g and 4.9 g, with a mean weight of 3.9 g (standard deviation of 0.44). The second set of the mass elements was steel discs having an outer diameter of 25.4 mm with a small hole in the middle and cross section area of 4.85 $cm^2$. The weight of the mass elements was varied between 19.0 g and 19.6 g, with a mean weight of 19.4 g (standard deviation of 0.14). The mass elements were distributed over the surface of the quilted melamine foam layer in 9 vertical rows over 1.32 m foam width. The resultant total density of the mass elements was 0.94 kg $m^2$ for the first layer and 0.33 $kg/m^2$ for the second layer.

The example absorber was made by the lamination process described below. A vinyl acetate water based glue (WA 2173 available from efi Polymers) was applied by a roller onto one surface of the first foam layer at a rate of approximately 0.3 $kg/m^2$. The corresponding sets of mass elements were placed on the glue layer, and the second foam layer with nylon 6,6 scrims laminated on both sides was placed over the mass elements. Another layer of glue was applied over the second foam layer and the corresponding sets of mass elements were placed on the glue. A melt blown polyester layer having about 20 mm thickness, 0.33 $kg/m^2$ basis weight, and 130 rayls specific air resistance was placed over the mass elements. No limp mass barrier was used in this assembly. The resultant absorber was about 38 mm thick and had the following bottom to top structure: quilted foam, mass elements, foam, nonwoven layer. The total basis weight of the absorber was 3.14 $kg/m^2$ and the total size of the absorber was 3.0 m by 4.3 m.

A comparative absorber was prepared without mass elements and with addition of a limp mass barrier. The total basis weight of the absorber was 6.75 $kg/m^2$. The comparative example had approximately twice the weight of the inventive absorber.

The absorber was applied to an uninsulated single steel stud wall having a 16 mm gypsum board on each side, over an area of 3.0 m by 4.3 m. The wall was built into the test frame directly and sealed between source and receiving rooms.

The example and comparative absorbers were conditioned as described in Example 1. The frequency response data in the form of narrowband of the sound pressure level (SPL) (1 Hz sampling resolution) data was obtained as in Example 1, but using a different testing arrangement. The speaker was placed 1 inch from the wall in the source room facing the wall. The microphone was similarly placed 1 inch from the wall in the receiving room. Hemi-anechoic enclosure was used around the microphone to prevent sound radiation from the test environment.

Figure 8A:
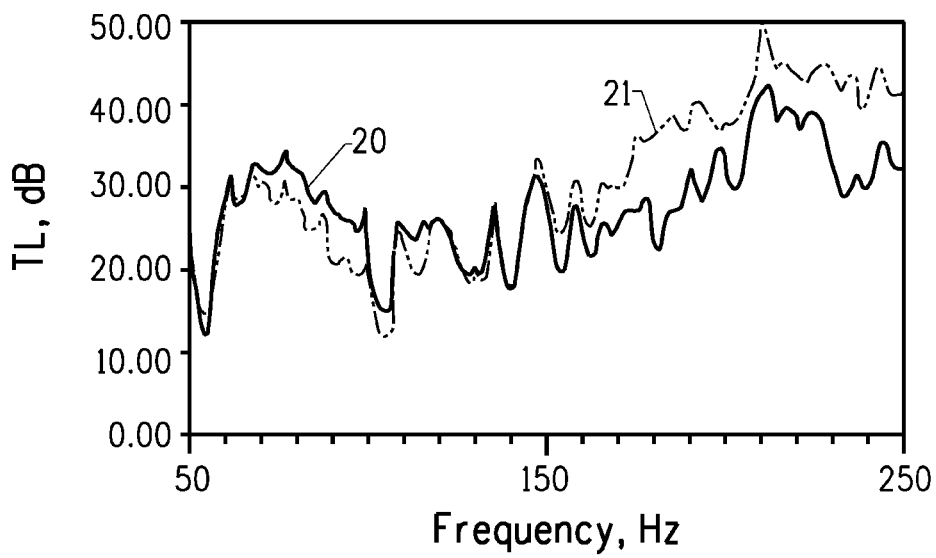
FIG. 8a illustrates the frequency response (narrowband data) of a vibrating single metal stud wall over a frequency range of 50 Hz to 250 Hz, with no vibration absorber applied and with a vibration absorber according to the prior art.
Figure 8B:
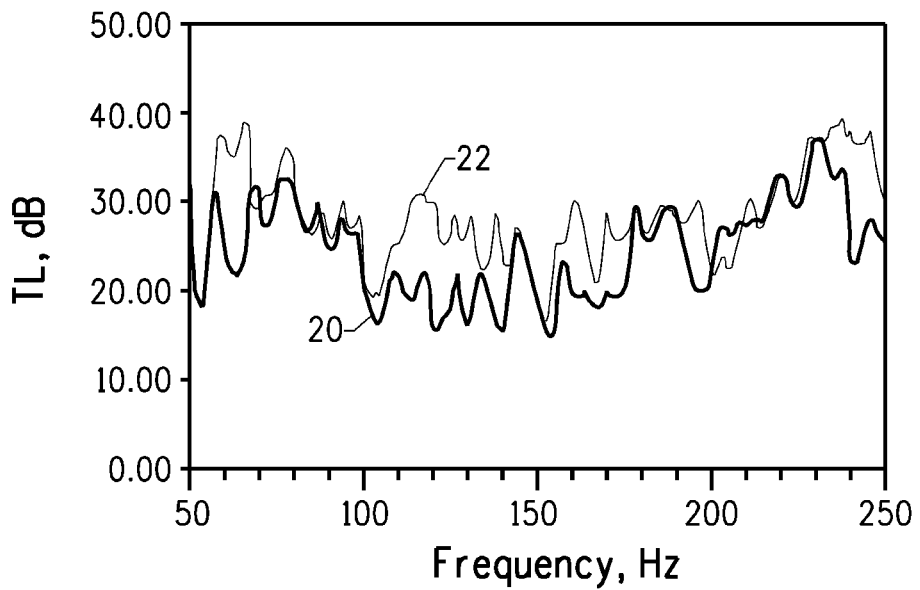
FIG. 8b illustrates the frequency response (narrowband data) of a vibrating single metal stud wall over a frequency range of 50 Hz to 250 Hz, with no vibration absorber applied and with a vibration absorber according to the invention.

FIGS. 8a and 8b illustrate the performance of the comparative absorber (FIG. 8a) and example absorber (FIG. 8b) in a frequency range from 50 Hz to 250 Hz. The example absorber exhibits improved performance in terms of TL (narrowband data) over the frequency range between about 60 Hz and about 170 Hz when compared to the frequency response of the comparative absorber and from about 100 Hz to 170 Hz when compared to the frequency response of the metal stud wall without the absorber.

What is claimed is:

1. A vibration absorber comprising:
    a) a viscoelastic layer for distribution over a modally dense vibrating structure having an effective mass and that when excited by a broadband input excitation, the vibrating structure exhibits a frequency response spectrum in which a first and a second targeted natural frequency are present
    b) a plurality of discrete mass elements in contact with said viscoelastic layer wherein a first portion of the discrete mass elements are tuned to absorb vibration at the first targeted natural frequency and a second portion of the discrete mass elements are tuned to absorb vibration at the second targeted natural frequency of the vibrating structure, wherein the mass ratio of the cumulative mass of said discrete mass elements tuned to a natural frequency of the vibrating structure to the effective mass of the vibrating structure at the corresponding natural frequency is less than about 0.04.

2. A vibration absorber comprising:
    a) a viscoelastic layer for distribution over a modally dense vibrating structure having an effective mass and that when excited by a broadband input excitation, the vibrating structure exhibits a frequency response spectrum in which a first and a second targeted natural frequency are present
    b) a plurality of discrete mass elements in contact with said viscoelastic layer wherein a first portion of the discrete mass elements are tuned to absorb vibration at the first targeted natural frequency and a second portion of the discrete mass elements are tuned to absorb vibration at the second targeted natural frequency of the vibrating structure, wherein the ratio of the mass of each of the plurality of discrete mass elements to the mass contact area A is less than about 5 g/m².

3. A vibration absorber comprising:
    a) a viscoelastic layer for distribution over a modally dense vibrating structure having an effective mass and that when excited by a broadband input excitation, the vibrating structure exhibits a frequency response spectrum in which a first and a second targeted natural frequency are present
    b) a plurality of discrete mass elements in contact with said viscoelastic layer wherein a first portion of the discrete mass elements are tuned to absorb vibration at the first targeted natural frequency and a second portion of the discrete mass elements are tuned to absorb vibration at the second targeted natural frequency of the vibrating structure, wherein the viscoelastic layer has a cross-sectional profile comprising thinner portions and thicker portions wherein the thinner portions of the first viscoelastic layer have a stiffness higher than the thicker portions of the first viscoelastic layer.

4. A vibration absorber to provide broadband control of vibration emanating from a surface of a modally dense vibrating structure when the structure is excited by a broadband input excitation, wherein the vibrating structure has an effective mass and the vibrating structure exhibits a frequency response spectrum in which at least two targeted natural frequencies are present, the absorber comprising:
    a) a viscoelastic layer having a dynamic stiffness distributed over the vibrating surface;
    b) a plurality of discrete mass elements contacting said viscoelastic layer tuned to the targeted natural frequencies of the vibrating structure;
    wherein the absorber is tuned to each targeted natural frequency $\omega_i$ in accordance with the following equations:

$$\text{a mass ratio, } \mu_i = \Sigma m_{2i}/m_{1i} \quad (i)$$

wherein:
    $\Sigma m_{2i}$ represents the cumulative mass of the plurality of discrete mass elements tuned to a targeted natural frequency $\omega_i$, $m_{1i}$ represents the effective mass of the vibrating structure at natural frequency $\omega_i$; and said mass ratio is less than about 0.04; and $$\omega_i = (k_i^*/(m_{2i}/A_i))^{1/2} \quad (ii)$$

wherein:
    i is the number of the natural frequency $\omega_i$
    $m_{2i}$ is the mass of each discrete mass element tuned to the same frequency $\omega_i$,
    $k_i^*$ is the normalized dynamic stiffness of the viscoelastic element for the ith natural frequency, and
    $A_i$ is the contact area over which each discrete mass element contacts the viscoelastic layer wherein at least one parameter selected from the group consisting of mass of the discrete mass elements, mass contact area of the discrete mass elements and stiffness of the viscoelastic layer is set to at least i values so that the absorber is tuned to at least i targeted natural frequencies.

5. A method of constructing a vibration absorber comprising a viscoelastic layer for distribution over a modally dense vibrating structure having an effective mass and that when excited by a broadband input excitation, the vibrating structure exhibits a frequency response spectrum in which a first and a second targeted natural frequency are present and a plurality of discrete mass elements in contact with said viscoelastic layer wherein a first portion of the discrete mass elements are tuned to absorb vibration at the first targeted natural frequency and a second portion of the discrete mass elements are tuned to absorb vibration at the second targeted natural frequency of the vibrating structure, comprising the steps of:
    a) analyzing the natural frequencies of the structure for
        I. amplitude of the sound pressure level over the frequency range of interest, and
        II. the mode shapes at each frequency over the surface of the structure, and
        III. the location of antinodes; and
    b) selecting at least two specific natural frequencies to be attenuated, and
    c) calculating said viscoelastic layer stiffness, the mass of said discreet mass elements, and contact area of said discrete mass elements wherein:

$$\text{I. } \omega = (k^*/(m/A))1/2 \quad (4)$$

wherein:
        i. $\omega$ is frequency of the vibration or acoustic radiation (in units of rad/s); and
        ii. m is the mass of the mass component of the system, i.e. each of the discrete mass elements (in units of grams); and
        iii. A is the contact area between each mass element and the viscoelastic layer (in units of cm2), and
        iv. $k^*$ is the normalized dynamic stiffness of said viscoelastic layer (in units of N/cm/cm2), which is defined as the dynamic stiffness of the spring component normalized by dividing by the mass contact area (k/A); and
        II. the mass ratio of discrete mass units tuned to a said natural frequency, $\omega 1$, is $\mu\omega 1 = \Sigma m 2\omega 1/m1\omega 1$
        wherein:
            i. $\Sigma m2\omega 1$ represents the sum of all discrete mass elements tuned to frequency 107 1, and
            ii. $m1\omega 1$ represents the effective mass of said modally dense vibrating structure vibrating at frequency $\omega 1$, and said mass ratio is equal to about 0.04; and
    d) applying said discrete mass elements to the viscoelastic layer at and near the anti-nodes.

* * * * *